United States Patent [19]

Bartrum

[11] 4,118,166

[45] Oct. 3, 1978

[54] EXTRUSION APPARATUS

[75] Inventor: David Edward Bartrum, Bay Village, Ohio

[73] Assignee: The BF Goodrich Company, Akron, Ohio

[21] Appl. No.: 818,175

[22] Filed: Jul. 22, 1977

[51] Int. Cl.² ............................................. B29F 3/04
[52] U.S. Cl. ................................. 425/462; 264/171; 425/133.5
[58] Field of Search ................ 264/171, 241, 245; 425/462, 131.1, 133.5, 190, 376 R, 192 R

[56] References Cited

U.S. PATENT DOCUMENTS

| | | | |
|---|---|---|---|
| 3,813,199 | 5/1974 | Friesner | 425/462 X |
| 3,959,432 | 5/1976 | Wiley | 425/133.5 X |
| 4,015,925 | 4/1977 | Heilmayr | 425/376 R X |

Primary Examiner—Francis S. Husar
Assistant Examiner—Mark Rosenbaum
Attorney, Agent, or Firm—Joseph Januszkiewicz

[57] ABSTRACT

An extruder apparatus and method for forming a co-extruded article wherein the die head of a first extruder forms the primary extrudate which is shaped from a cylindrical form into a thin oblong elongated form. A second extruder feeds its plasticated extrudate to the first extruder die head where the second extrudate is shaped into a thin narrow film for merging the two extrudate into a single elongated composite film for extrusion as an integral film from the die head as a shaped article.

7 Claims, 8 Drawing Figures

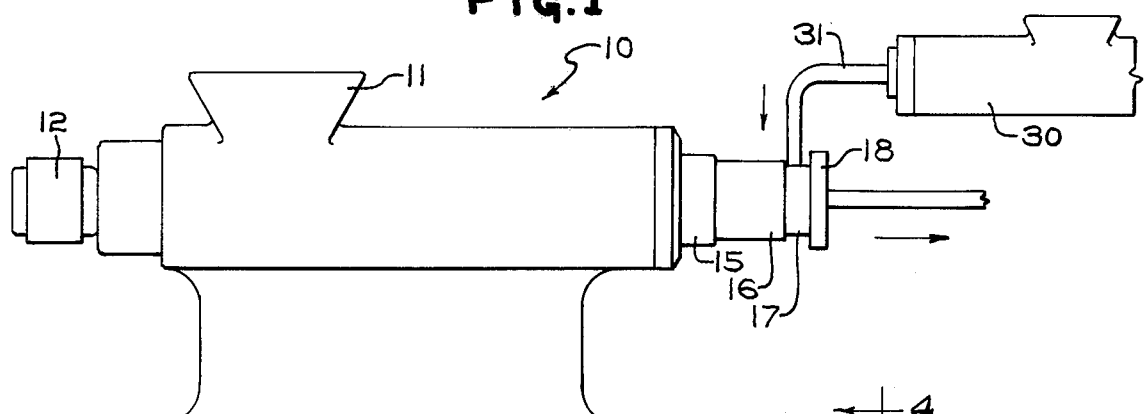
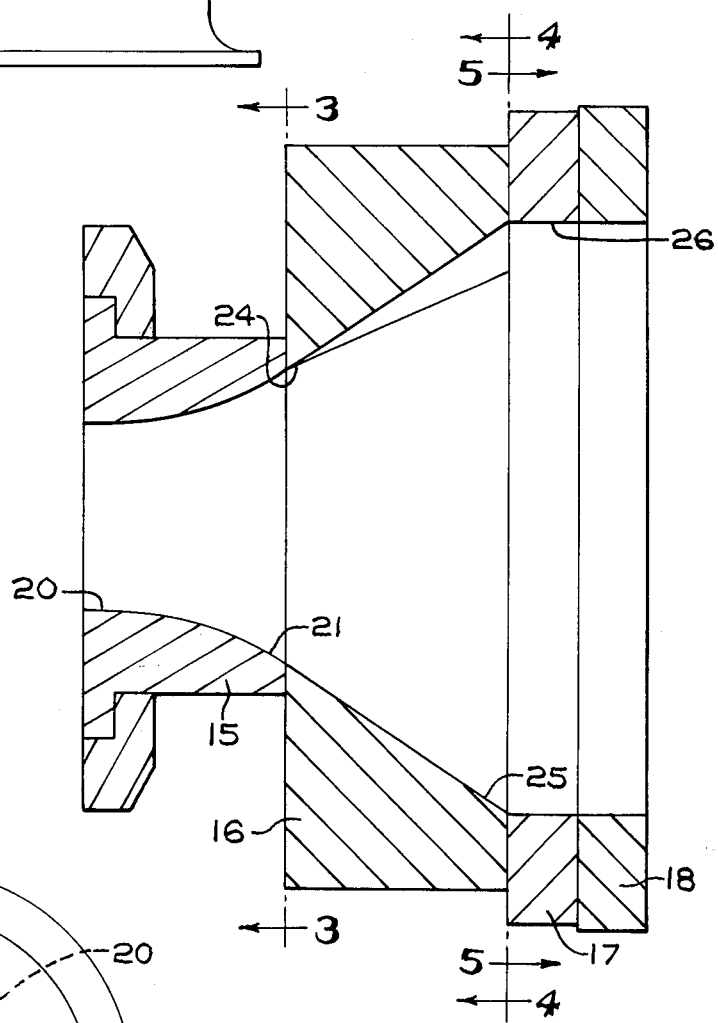
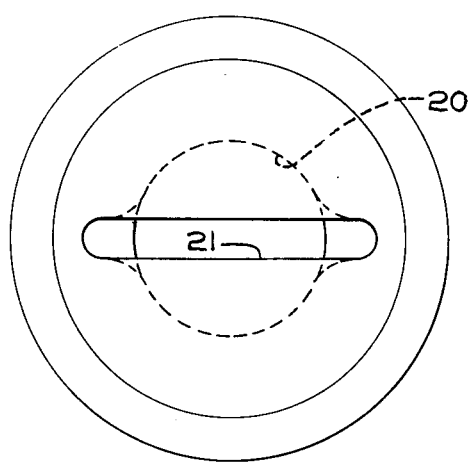

EXTRUSION APPARATUS

BACKGROUND OF THE INVENTION

This invention relates to an extruder and more particularly to a method and apparatus for co-extruding a thin formed thermoplastic sheet.

In the production of a co-extruded article, it was found desirable to laminate plastic film of diverse properties such as low density, high melt index to another material having high density but low melt index. This type of co-extrusion although found more desirable than lamination after separate extrusions had difficulty in bringing the separate melts from different extruders into a common manifold for joining because the equipment was relatively expensive and complex. The present invention overcomes these objections by introducing a separate extruder block which is disposed adjacent the fully formed article prior to the die opening to facilitate the lateral expansion of the second melt onto the lateral expanded first melt. This apparatus and method facilitates its introduction into a system and is particularly effective in applying a cap stock such as the second melt as a thin film over a controlled portion only of the expanded primary melt. Such apparatus facilitates the quick removal of a separate feedblock and returning the extruder to its former single fold function of being a conventional extruder.

SUMMARY OF THE INVENTION

The present invention contemplates a co-extrusion apparatus having a first extruder directing its melt into a die head that shapes the cylindrical melt into its general laterally extending oblong flat form or final general shape and thereafter directing a second melt as a thin film onto a selected portion of the first oblong form to form an integral composite sheet substantially in final shape. The composite sheet is given its final form by the orifice opening of the die block.

BRIEF DESCRIPTION OF DRAWINGS

FIG. 1 is a diagrammatic side elevational view of the apparatus in accordance with the invention.

FIG. 2 is a cross section view of the die head shown in FIG. 1.

FIG. 3 is a cross sectional view of the die head taken on lines 3—3 of FIG. 2.

DETAILD DESCRIPTION

Figure 4:
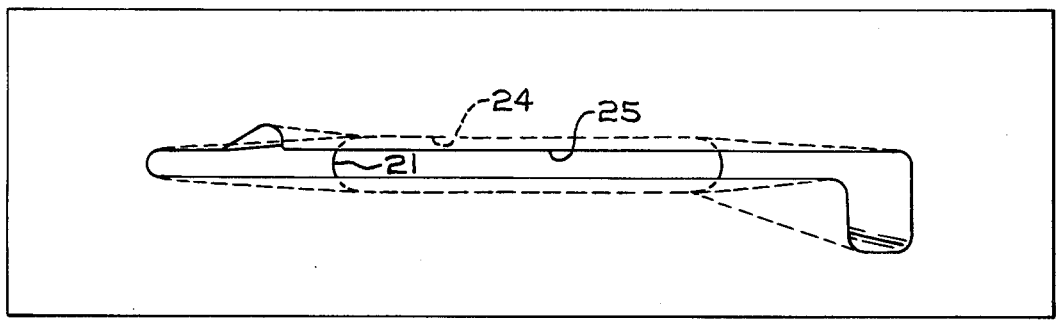
FIG. 4 is a cross sectional view of the die head taken on lines 4—4 of FIG. 2.

Referring to the drawings wherein like reference characters designate like or corresponding parts throughout the several views, there is shown in FIG. 1 a primary extruder 10 having a hopper 11, a motor 12 that drives the feed screw not shown in a manner well known in the art. Extruder 10 has forwardly disposed die head comprised of neck block 15, a shaping block 16, a feed block 17, and a die block 18.

The neck block 15 is suitably attached to the forwardly disposed portion of the extruder having a circular bore 20 in one end thereof that merges into an oblong shaped bore 21 at the other end thereof. The bore 20 is of the same size as that of the extruder exit passageway to facilitate the smooth passage of the extrudate therebetween. Disposed forwardly of the neck block 15 is a shaping block 16 which has a forwardly disposed oblong bore 24 at one end thereof mating with the oblong bore 21 of neck block 15. Bore 24 tapers downwardly and laterally outwardly in both directions to form a thin narrow elongated channel 25.

Figure 5:
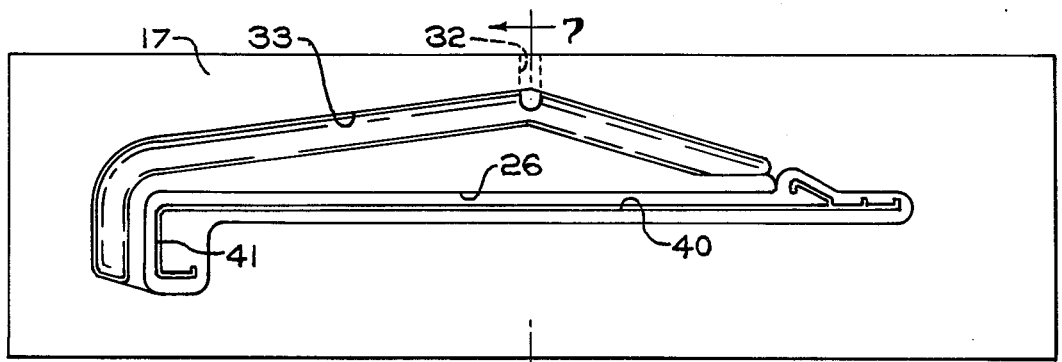
FIG. 5 is a cross sectional view of the die head taken on lines 5—5 of FIG. 2.
Figure 6:
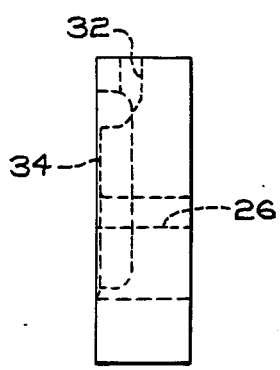
FIG. 6 is end view of the feed block in the die head.
Figure 7:
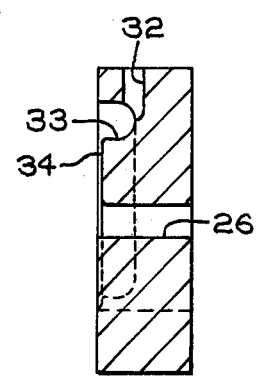
FIG. 7 is a cross sectional view of the feed block taken along lines 7—7 of FIG. 5.
Figure 8:
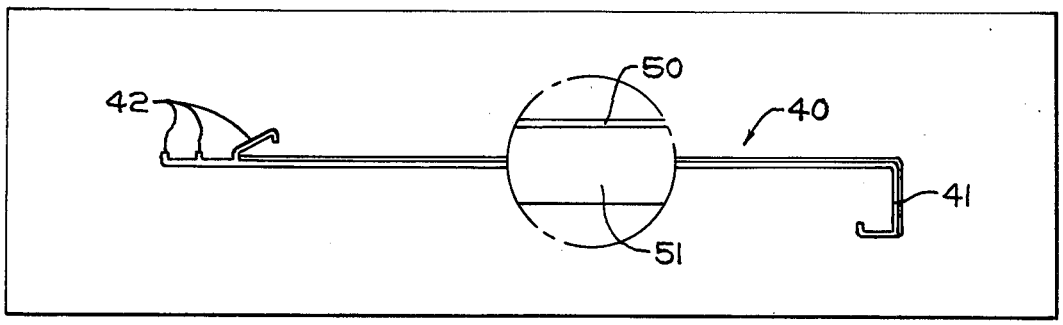
FIG. 8 is a front elevational view of the die head.

Mounted forwardly of the shaping block 16 is a feedblock 17 having at the one end thereof a narrow elongated channel 26 substantially identical to that of elongated channel 25 of shaping block 16. A second extruder 30 having a hopper and motorized feed screw conveys its extrudate via conduit 31 directly to a bore 32 in the upper end portion of feedblock 16 to supply a second melt to such feedblock. Bore 32 communicates with a laterally extending distribution channel 33 which tapers downwardly and extends substantially for the full width of elongated channel 26. Distribution channel 33 then communicates via a narrow slit 34 to the elongated channel 26. The narrow slit 34 is formed by recessing the feedblock and cooperating such recess with the solid face of shaping block 16 to form slit 34 which acts as a dam to facilitate the distribution of the melt for the full width of the distribution channel 33 to provide an even coating onto the primary melt from the primary extruder passing through passageway 26. Die block 18 as shown in FIG. 8 has an elongated narrow slit aperture or orifice 40 that extends substantially for the full width of the die block and being formed to the shape of the article being extruded. In the example shown the aperture or orifice 40 is formed into the shape of a house siding panel having a lower L-shaped portion 41 at one end thereof, and plurality of projections 42 at the other end thereof, which projections 42 facilitate the attachment to an adjacent siding panel in a manner well known in the art. An enlargement of the aperture in FIG. 8 discloses the extrudate as having a thin cap stock 50 and extrudate body portion 51. The orifice 40 extends rearwardly from the forward portion of the die block, tapers outwardly and merges with the elongated narrow channel 26 in feedblock 17. As seen in FIG. 5 the channel 26 is considerably thicker in dimension than aperture 40.

In the operation of the apparatus and of the method of the present invention, the extrudate from the primary or first extruder 10 is directed as a cylindrically shaped extrudate to the neck block 15 of the die head. The extrudate is then flattened slightly into a broad oblong form in cross section as depicted by the full lines of FIG. 3. The extrudate then passes from the neck portion 15 to the shaping block 16 which flares out the melt laterally in both directions while reducing the thickness of the melt. As the extrudate passes into the feed block 17 substantially to the final shape except for reduction in thickness, the cap stock from a second extruder is directed into bore 32 of feedblock 17 from the second extruder 30. The cap stock melt is directed via distribution channel 33, and the dam directly below it laterally outwardly to flow as a thin film onto substantially the full width of the extrudate flowing in channel 26 except for one end portion which has the projections 42 thereon. Since such end portion containing the projections 42 is covered in actual use by an adjoining panel, this portion needs no cap stock; which cap stock may be of different colors, different chemical composition and physical properties since it is this portion that is exposed to the weathering elements. Thus as the extrudate issues from the extruder it is formed by the orifice 40 of die block 18 into a house siding configuration having the primary extrudate 51 covered on one side by a thin film cap stock 50 of a different melt.

Various modifications are contemplated and may obviously be resorted to by those skilled in the art without departing from the described invention, as hereinafter defined by the appended claims, as only a preferred embodiment thereof has been disclosed.

I claim:

1. An extrusion die head having a neck block for connection to the outlet end of an extruder, said neck block having a cylindrical bore at one end thereof and an oblong bore at the other end thereof, said cylindrical bore tapering into said oblong bore, a shaping block secured to said neck block, said shaping block having an oblong bore at one end mating with said oblong bore of said neck block, said shaping block having a preformed laterally extending generally L-shaped thin passageway at the other end thereof, said oblong bore of said shaping block tapering laterally outwardly in both directions to merge smoothly with said L-shaped passageway, a thin width feed block mounted adjacent to said shaping block, said feed block having an L-shaped passageway identical in size and shape to said L-shaped passageway of said shaping block extending therethrough, a die block mounted adjacent to said feed block having an L-shaped passageway at one end thereof, said L-shaped passageway of said die block merging with said L-shaped passageway of said feed block, a thin L-shaped orifice at the other end of said die block for shaping extrudate therefrom, said L-shaped passageway of said die block tapering downwardly in thickness to form said thin orifice, said feedblock having a second passageway communicating with said L-shaped passageway therein, and said second passageway being in alignment with and communicating with said L-shaped passageway in said feed block for depositing a thin film of extrudate onto the extrudate passing through said L-shaped passageway in said feeder block.

2. An extrusion die head as set forth in claim 1 wherein the width of said second passageway is less than the width of said L-shaped passageway to deposit said thin film over a portion of said extrudate passing through said L-shaped passageway.

3. An extrusion die head as set forth in claim 1 wherein said feed block has a cylindrical bore connected to said second passageway for interconnecting said second passageway with an extruder, and said second passageway having a dam along the full length thereof to distribute evenly a thin film of melt into the extrudate passing through said L-shaped passageway in said feed block.

4. An extrusion die head as set forth in claim 3 wherein said bore in said feed block communicates with the mid-point of said second passageway, and said dam is of greatest depth at said mid-point and tapers in depth in a direction laterally away from said mid-point.

5. An extrusion die head for use with an extruder, one end of said die head having a cylindrical bore for receiving an extrudate from an extruder, said cylindrical bore tapering downwardly and laterally in both directions away from the center thereof into an elongated thin passageway, said passageway terminating into a thin elongted orifice to form a thin elongated extrudate, said die head having a second bore extending therein, said second bore communicating with an elongated distribution channel, said channel extends substantially the full width of said elongated thin passageway, said channel tapers into a narrow laterally extending slit between said channel and said elongated thin passageway defining a dam to distribute evenly the flow of melt from said channel to the full lateral width of said elongated thin passageway for depositing a thin film thereon.

6. An extrusion die head as set forth in claim 5 wherein said orifice is L-shaped in cross section to form a house siding panel, and said narrow passageway is L-shaped substantially identical in length to said L-shaped orifice.

7. An extrusion die head as set forth in claim 6 wherein said distribution channel extends downwardly and laterally to provide a dam of greater length at the mid-point of said channel and of lesser length in the direction away from said mid-point.

* * * * *